United States Patent
Maichel

(10) Patent No.: US 10,512,950 B2
(45) Date of Patent: Dec. 24, 2019

(54) VALVE BODY AND METHOD OF TRANSFORMING A VALVE BODY INTO A FUNCTIONING VALVE

(71) Applicant: Jeffrey L. Maichel, Murrieta, CA (US)

(72) Inventor: Jeffrey L. Maichel, Murrieta, CA (US)

(*) Notice: Subject to any disclaimer, the term of this patent is extended or adjusted under 35 U.S.C. 154(b) by 28 days.

(21) Appl. No.: 15/942,429

(22) Filed: Mar. 30, 2018

(65) Prior Publication Data

US 2018/0281029 A1    Oct. 4, 2018

Related U.S. Application Data

(60) Provisional application No. 62/479,233, filed on Mar. 30, 2017.

(51) Int. Cl.

| | |
|---|---|
| *B08B 9/00* | (2006.01) |
| *F16K 1/34* | (2006.01) |
| *F16K 3/30* | (2006.01) |
| *B08B 13/00* | (2006.01) |
| *F16K 3/02* | (2006.01) |
| *F16K 43/00* | (2006.01) |

(52) U.S. Cl.
CPC ............. *B08B 9/00* (2013.01); *B08B 13/00* (2013.01); *F16K 1/34* (2013.01); *F16K 3/0272* (2013.01); *F16K 3/0281* (2013.01); *F16K 3/30* (2013.01); *F16K 43/001* (2013.01); *B08B 2209/027* (2013.01)

(58) Field of Classification Search
CPC ..... F16K 1/34; F16K 3/30; B08B 9/00; B08B 13/00

USPC .......................................................... 137/312
See application file for complete search history.

(56) References Cited

U.S. PATENT DOCUMENTS

| | | | |
|---|---|---|---|
| 3,908,691 A | 9/1975 | Coughlin | |
| 3,948,282 A | 4/1976 | Yano | |
| 4,332,272 A | 6/1982 | Wendell | |
| 4,527,586 A | 7/1985 | Yano et al. | |
| 4,716,926 A * | 1/1988 | Jacobs | F16L 59/161 137/312 |
| 5,611,365 A | 3/1997 | Maichel | |
| 5,660,199 A | 8/1997 | Maichel | |
| 5,732,728 A | 3/1998 | Maichel | |
| 6,041,806 A | 3/2000 | Maichel | |
| 6,164,622 A | 12/2000 | Partridge | |
| 6,244,290 B1 * | 6/2001 | Reicin et al. | F16K 27/12 137/312 |
| 6,776,184 B1 | 8/2004 | Maichel et al. | |

(Continued)

FOREIGN PATENT DOCUMENTS

JP    2007177945 A    7/2007

*Primary Examiner* — Kevin L Lee
(74) *Attorney, Agent, or Firm* — Loza & Loza, LLP; Michael F. Fedrick

(57) ABSTRACT

A valve body with conduits on opposing sides having attachable pressure cover-plates and valve servicing assemblies that can be selectively installed onto the valve body while it is fully pressurized. The valve body includes simple isolators that allow access openings to be blocked and exposed that allow various style operating mechanisms and tools without the need for intermediate isolating mechanisms. Attachable subcomponents can provide pressurized fluid that is injected into the valve body from an external power source to move sand and debris away from seating surfaces while advancing and retracting various style gates.

10 Claims, 8 Drawing Sheets

(56) References Cited

U.S. PATENT DOCUMENTS

| | | |
|---|---|---|
| 6,983,759 B2 | 1/2006 | Maichel et al. |
| 7,021,325 B2 | 4/2006 | Maichel et al. |
| 7,225,827 B2 | 6/2007 | Maichel et al. |
| 9,004,095 B2 | 4/2015 | Maichel |
| 2009/0140195 A1 | 6/2009 | Shibata et al. |
| 2009/0260695 A1 | 10/2009 | France et al. |

\* cited by examiner

VALVE BODY AND METHOD OF TRANSFORMING A VALVE BODY INTO A FUNCTIONING VALVE

CROSS-REFERENCE TO RELATED APPLICATIONS

This application claims the benefit of priority under 35 U.S.C. § 120 from U.S. Patent Application No. 62/479,233, filed Mar. 30, 2017, the disclosures of which is incorporated herein by reference in its entirety.

BACKGROUND

A typical repair valve is not a flanged structure that can allow depressurization of the structure surrounding an internal valve. Existing U.S. Pat. Nos. 3,908,691 and 6,983,759, for example, provide a "mother-valve" completely encompassing and containing a repairable or removable valve which is submerged in the pipeline fluid during its entire useful life. Such valves cannot easily use off-the-shelf pipeline control mechanisms, actuators and levers without providing complicated fluid tight seals between the "mother-valve" and the pipeline control mechanism because they are pressurized together.

An alternative valve is disclosed in U.S. Pat. No. 9,004,095. This valve connects two conduits with a support structure that can be opened to drain the structure's hollow through-passage by opening a port connected to the structure. This structure receives a gate with a selected valve and provides fluid communication between the first and second openings of the housing and is removably installed within the housing. However, this structure does not easily clear debris from the gate seating area, which can interfere with the valve's gate and body from seating in fluid tight engagement, and softer, corrosion resistant materials such as PVC, HDPE and composites are not ideal for use in this valve. There remains a need, therefore, for improved pipeline control valves.

SUMMARY

The present valve comprises a housing having a proximal conduit portion and a distal conduit portion. The proximal conduit portion comprises a proximal conduit with an interior surface for conducting a fluid, a proximal end for coupling to another conduit and a distal end, and a proximal flange extends outwardly from the distal end of the conduit. The flange includes a proximal upper groove extending between the right side and the left side of the proximal flange above the proximal conduit and a proximal lower groove extending between the right side and the left side of the proximal flange below the proximal conduit. The distal conduit portion likewise comprises a distal conduit and a distal flange extending outwardly from the proximal end of the distal conduit. The inner face of the distal flange faces the inner face of the proximal flange of the proximal conduit portion, and the inner face of the distal flange is in fluid tight engagement with the inner face of the proximal flange around a periphery of the proximal flange and the distal flange. The distal flange further includes a distal upper groove extending between the right side and the left side of the distal flange above the distal conduit and a distal lower groove extending between the right side and the left side of the distal flange below the distal conduit. The distal upper groove and proximal upper groove are adjacent to each other and cooperate to form an upper elongated receptacle for an upper closure rod, and the distal lower groove and proximal lower groove are adjacent to each other and cooperate to form a lower elongated receptacle for a lower closure rod. The upper closure rod, when present, is held in fluid-tight engagement when positioned in the upper elongated receptacle, and the lower closure rod is held in fluid-tight engagement when positioned in the lower elongated receptacle.

The housing further includes a proximal support plate extending around the periphery of the proximal conduit adjacent to the outer face of the proximal flange and a distal support plate extending around the periphery of the distal conduit adjacent to the outer face of the distal flange, and wherein the proximal support plate is secured to the distal support plate. An upper cover plate is reversibly securable to the upper end of the proximal support plate and the upper end of the distal support plate, and a lower cover plate is reversibly securable to the lower end of the proximal support plate and the lower end of the distal support plate. The housing can also include an upper slot between the inner face of the proximal flange and the inner face of the distal flange and extending between the upper end of the housing and the proximal and distal conduits and a lower slot extending between the lower side of the housing and the proximal and distal conduits in order to allow the passage of a gate therethrough.

DRAWINGS

Figure 1:
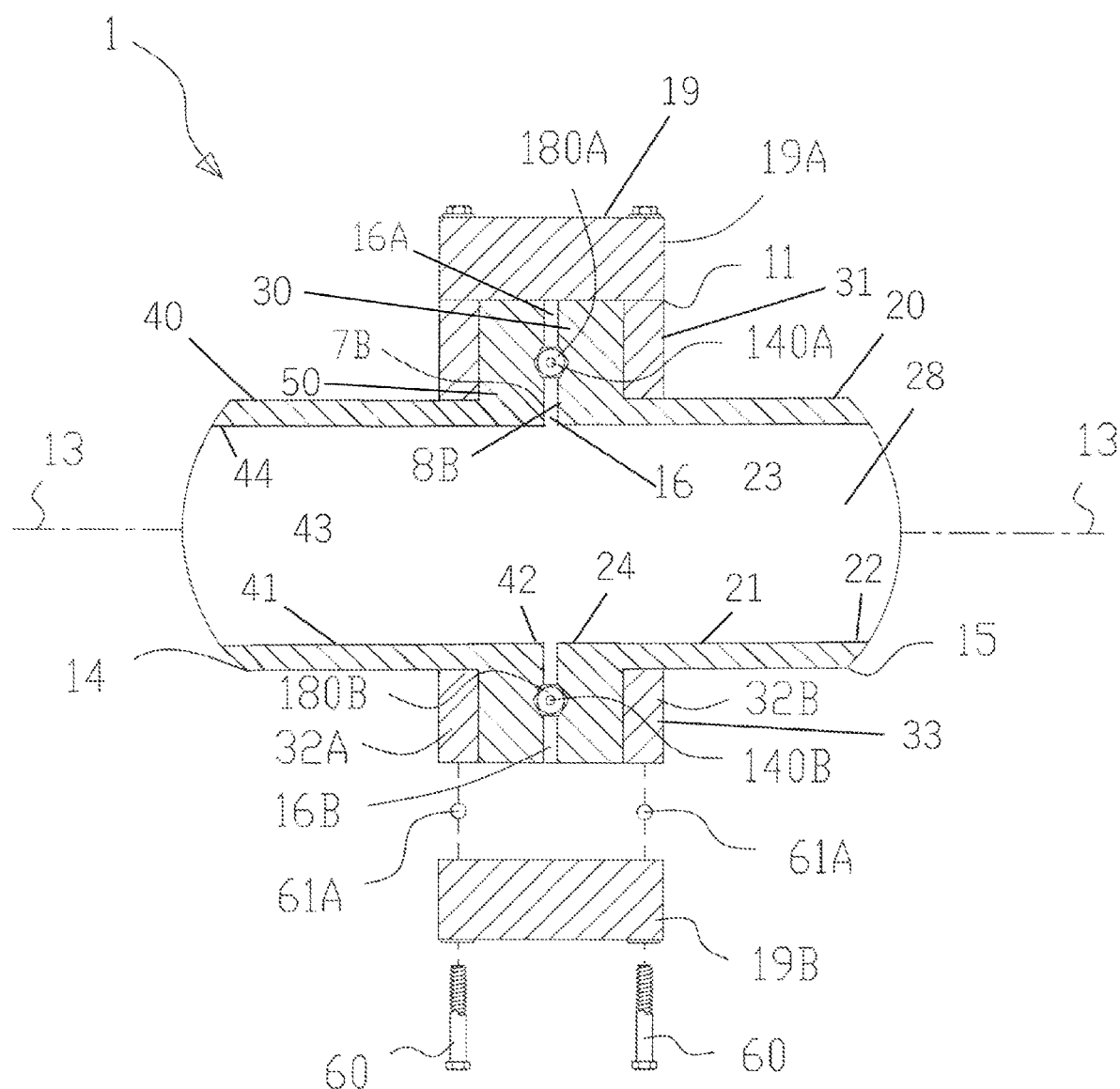
FIG. 1 is a cross-sectional view taken through the center of an embodiment of the present valve between the proximal and distal ends of the valve.

The reference numbers in the figures have the following meanings:

| Component | Reference Number |
| --- | --- |
| valve | 1 |
| valve body | 5 |
| housing | 11 |
| housing proximal end | 15 |
| housing distal end | 14 |
| gate | 12 |
| slot | 16 |
| upper portion of the slot | 16A |
| lower portion of the slot | 16B |
| cover plates | 19 |
| upper cover plate | 19A |
| lower cover plate | 19B |
| proximal conduit portion | 20 |
| proximal conduit | 21 |

-continued

| Component | Reference Number |
|---|---|
| proximal conduit interior surface | 23 |
| proximal conduit proximal end | 22 |
| proximal conduit distal end | 24 |
| proximal flange | 30 |
| proximal flange upper end | 31 |
| proximal flange lower end | 33 |
| proximal flange right side | 34 |
| proximal flange left side | 36 |
| proximal flange outer face | 35 |
| proximal flange inner face | 8B |
| proximal upper groove | 38 |
| proximal lower groove | 39 |
| distal conduit portion | 40 |
| distal conduit | 41 |
| distal conduit interior surface | 43 |
| distal conduit proximal end | 42 |
| distal conduit distal end | 44 |
| distal flange | 50 |
| distal flange upper end | 51 |
| distal flange lower end | 53 |
| distal flange right side | 54 |
| distal flange left side | 56 |
| distal flange outer face | 55 |
| distal flange inner face | 7B |
| distal upper groove | 58 |
| distal lower groove | 59 |
| support plates | 32 |
| distal support plate | 32A |
| proximal support plate | 32B |
| support plate right side | 32C |
| support plate left side | 32D |
| support plate upper end | 32E |
| support plate lower end | 32F |
| gate planing edge | 70 |
| closure rod | 140 |
| upper closure rod | 140A |
| lower closure rod | 140B |
| closure rod proximal end | 141 |
| closure rod distal end | 143 |
| lower pipe plug | 142 |
| upper pipe plug | 147 |
| gate-mechanism | 160, 170 |
| rod access ports | 180 |
| upper access port | 180A |
| lower access port | 180B |

DETAILED DESCRIPTION

Definitions

As used herein, the following terms and variations thereof have the meanings given below, unless a different meaning is clearly intended by the context in which such term is used.

"Below," "downward," "downwardly," "lower," and "under" mean in the direction of or toward the ground or other support surface on which the present valve is supported, in most cases. "Above," "upward," "upwardly," "upper," and "over" mean in the opposite direction, usually away from the ground or other support surface.

"Closure rod" refers to a component of the valve that uses an elongated rod, pin, bar or plate that isolates the conduit portion of the valve by sliding the closure rod through a groove or slot in the housing between its sides. Closure rods can be operated externally outside the valve structure by hand or by mechanical means.

"Connection" as used herein refers to a direct connection or an indirect connection via one or more intermediate fittings or other components (e.g. a size adapter fitting).

A "connector" refers to a mechanism or portion of a mechanism used to mechanically join two or more components of the present device. Connectors can take any of various forms including a flange, threaded receptacle (such as for a screw), groove locking mechanism, a machine screw connector, weld, fusing by heat or chemical compounds and any of many other known locking means. term is used.

"Elongated" refers to a configuration or shape having a length which is longer than its width.

"Flange" refers to a projecting flat rim or collar serving to strengthen or attach a portion or component of the present device.

"Fluid tight," in regard to a connection or other relationship between components or surfaces of the present device, refers to a connection or other configuration which does not allow fluid to pass through or across the fluid tight connection or engagement when the fluid is at a pressure within predetermined operating limits of the fluid tight connection or other engagement.

"Gate" refers to a component or device that can be temporary or retained in the slot and/or interior of the housing of the present valve housing which controls, affects the flow of a fluid through the present valve. Examples of gates include those that can stop fluid flow, pass flow, reduce fluid flow, such as one or more of the following: a gate, metal gate, wedge gate, plastic, composite, rubber coated gate, a directional-flow mechanism (e.g., a check valve), a through-flow cartridge retained in a gate such as an orifice plate, and/or a safety screen to screen particles. A gate can also include various configurations of the gate with adaptable edge to perform opening and planing of the gap to a larger width.

"Gate advancing mechanism" refers to a component that advances or withdraws a gate in a valve. Preferably, the pipeline control-advancing mechanism is capable of exerting "downward" force on the gate, in order to help install the gate. Common known gearing and attachments can make this a direct bury "nut" operated valve but many mechanisms use a hand-wheel, wrench or suitable tools with many known types operated by any powered source.

"Pipeline" as used herein includes any type, size, and composition of fluid-carrying conduit, including conduits for a gas.

"Plate" refers to a sheet or piece of rigid material (such as metal) that forms a distinct section or component of the present device, usually having a height and length that can be more rigid that the softer body material and use a larger end that can be fused, joined by a flange or welded.

"Pressure-producing pump" refers to known fluid pumping mechanisms that are commonly called "jetting machines" and many have reservoirs that can hold bulk fluids allowing the continual pumping of fluids at selective pressures. Jetting machines are generally motor-driven units that produce pressurized fluids used for various washing and flushing procedures.

Terms of relative position such as "upper," "lower," "top", "bottom," "proximal," "distal," "right," "left," and similar terms are used to designate areas and positions of portions or components of the present device with respect to other portions or components of the present device, but it is to be understood that these terms are relative and are not absolute terms.

As used herein, the term "comprise" and variations of the term, such as "comprising" and "comprises," are not intended to exclude other additives, components, integers or steps. The terms "a," "an," and "the" and similar referents used herein are to be construed to cover both the singular and the plural unless their usage in context indicates otherwise.

Overview of Valve and Methods of Use

The present invention relates generally to a valve and a method of using such a valve which can provide only the bottom half of a valve when initially installed into service, and at a later date the housing of the valve can be quickly and simply transformed into a complete and operational valve while a pipeline system is fully pressurized. To transform the existing housing into an operational valve, an operator pulls a cover plate and replaces it with an advancing-gate mechanism, operates a closure rod, advances the gate-mechanism to the fully closed position, and if required installs a plug where the closure rod was. Now the housing operates as a conventional valve. In reverse, using the same methods in different order, the present invention can initially be provided as a complete and fully operational valve and transformed into a non-operational bottom half of a valve at a later date.

By providing only the bottom half of a conventional valve, the actuator and gate are not exposed to corrosive environments until desired. By installing a relatively inexpensive bottom half of the valve, it affords more opportunity for a pipeline to incorporate additional valves into its design, or "potential valves" to be located within a pipeline system in case of an emergency. Because this assembly is preferably built with long-term materials, future valve locations can remain transformable for many years. Since gate mechanisms can be added and removed as desired, a pipeline owner may only need one gate-mechanism in each valve size to manage a pipeline system.

Closure rods integrated as part of the present valve's housing allow for various service attachments and gate-mechanisms to be simply installed directly to the valve housing without intermediate adapters and isolators. The valve body accepts flush-conveying attachments that can be selectively installed or removed to move particles away from a valve's moving components and seating surfaces. This provides the means to flush debris that has collected over time and reduces the possibility of damage to the seating surfaces by relocating deposits that may impede a valves seating.

A valve's fluid tight seating surfaces can be destroyed by abrasive particles being trapped between them and mechanically sliding or compressing these surfaces against one another while sharp and hard particles are present. For example, raw sewage is known to carry sludge, sand, rocks and other debris. By using pressurized fluid to push debris away from seating surfaces, softer, lighter and longer life materials can be used in valve production. At least portions of the present valve can, such as the conduit and flange portions, be made from preferably softer corrosive-resistant materials such as HDPE, PVC and other materials not usually used in pipelines.

The present valve can selectively attach flushing-producing assemblies that install directly onto the valve's body to wash seating surfaces, and also allows for a gate or gate-advancing-mechanism to be attached. Slots in the housing are designed to allow a gate to pass from the upper access opening into the valve body, and if desired, out through the lower access opening. The present valve can also include permanent or temporary closure rods that when externally advanced or rotated through openings on the valve housing intersect or move in internal slots in the housing to isolate and seal a gate's path. When closure rods are externally retracted through the valve body, the internal access is opened for a gate's path and can fully expose the open access to insert a gate. In one embodiment, a closure rod comprises a hollow rod that is positioned in the valve body and has an elongated through-passage that matches width of the slot between the surfaces of the interior faces of the flange portions of the housing. It crosses through the slot, and when rotated by external means, the rod can be removed from the through-passage so that a gate can be positioned in an inline position with the slot allowing the gate to pass unrestricted. When the closure rod is further rotated, a solid portion of the rod can be configured to block the slot so that fluid cannot pass.

The interior of the housing can be flushed by an external pump that attaches directly to the valves housing by introducing pressurized water, air or gas into the valve housing equal to or above the working pressure of the pipeline to flush debris. Furthermore, this flushing attachment being attached directly to the valve's structure allows an external pump to inject pressurized fluid internally creating a protective barrier and moving debris away from the gate and seating surfaces. Once the gate is advanced into its closed and seated position within the housing, the pump performing flushing activities can be stopped and removed. The gate seats only on opposing surfaces and not on the bottom, so when the gate is in the retracted position pressurized flow can be injected across the entire slot creating a one-banded barrier to push debris away from the gate and seating surfaces during engagement.

Preferably, the gates of the present valve have no taper and use matching sealing surfaces in order to allow the gate to pass from the "lower" access opening through the housing and out the "upper" access opening, or from the "upper" access opening through the housing and out the "lower" access opening without restriction. If needed, the gate can pass into a hollow gate mechanism with use of a gate-advancing mechanism on either side or both sides of the structure.

The invention provides at least one or more closure rods to selectively isolate upper and/or lower access openings. These closure rods can be permanently installed, semi-removed or completely removed, during the various stages of services being performed. Because soft materials are preferably used in the housing construction, closure rods may not need additional sealing members to make fluid tight engagement with the valve housing. The closure rods are larger in diameter than the gate and cross through the slots. Closure rods are long enough to cross through the entire length of the slot and are operated externally outside of the valve housing. When a closure rod is fully advanced or pushed into the valve housing, or rotated to the "closed" position, isolating the internal slot sealing it in fluid tight engagement so no fluid can pass. When the closure rod is "retracted" away from the valve housing or rotated to the "open" position, the slot can be fully exposed to receive a gate or accept flushing assemblies.

Clearing of Debris

The present valve in particular addresses the problem of damage that can be caused to seating surfaces by fluid containing particles. Known valves suffer damage to their fluid tight seating surfaces due to abrasives being trapped and mechanically ground between moving parts that can inflict scoring and gouging of surfaces.

This invention provides a valve body that can selectively incorporate attachments that can move sands and debris by injecting flow from an external powered source to push or flush debris out of the pathway of seating surfaces during the installation and retraction of a gate. Access openings in the valve's housing are arranged to facilitate removable flushing assemblies. These assemblies are installed directly onto the valves housing without the need of an intermediate member.

The pressurized fluid can be injected into the valves housing at the pipelines operating pressure or at a greater pressure. Flushing reduces the risk of damage suffered by the gate and valve-seating surfaces when the gate is forced into fluid tight engagement in aggressive environments.

Many known power-flushing pumps that can create powered fluid can be used. The most typical in a field environment would be a motor driven pressure producing water pump, with a fluid reservoir able to hold enough fluid to complete washing of debris while a gate is being advanced or retracted.

Valve Housing

The present invention relates to a valve housing that is connected on each side to a pipeline. This valve housing is constructed to receive attachable components directly to its surface such as gate-mechanisms that can be selectively installed to easily transform the valve housing into a fully functional and operating control valve, able to control a pipelines flow. Optionally, a fully functional operating control valve can be initially connected to the valve housing, and it can later be transformed into a non-functioning valve housing. In addition, other attachable components can be added to perform flushing of the interior seating surfaces so the gate can be installed in a clean fashion.

The "upper" access opening and the "lower" access opening can be used to install or remove a gate. The gate can selectively pass through the "upper" access opening, through the valve body and out the "lower" access opening unrestricted. Conventional seals such as O-rings, flexible compounds and gaskets can be used to facilitate a fluid tight seal.

In order to maintain pressure within the presented valve housing and pipeline system during gate changes or flushing operations, the access openings can be reversibly secured in a fluid tight manner by isolation means that seal the access opening prior to the cover assemblies. This isolation means can include at least one service isolator that is built into the valve body and presented here as a "closure rod". The closure rod is equal to or larger in diameter than the gate access and crosses through or intersects a slot within the housing and is opened and closed by movements performed outside of the valve housing. The closure rod is long enough to seal the whole length of the slot and can be fully advanced into the "installed" or "closed" position or rotated into the "closed" position. When the closure rod is in the "closed" position it isolates the whole length of the slot so no fluid can pass, which allows the housing to operate fully pressurized when cover plates are removed for services.

This embodiment of closure allows various assemblies to be attached directly to the valve housing's structure without an intermediate isolating mechanism. When a cover plate, a gate-mechanism, or flushing attachment is attached directly to the housing over the access opening, the closure rod can be "retracted" or rotated to create an "open" position of the slot to fully expose the area intended to receive a gate mechanism or to inject pressurized fluid. One type of closure rod has an external end that can incorporate a tapered threaded plug so when in the fully closed position the attached plug seals off fluid from passing out of the valve body and can secure the closure rod in a closed position. For advancing and retracting versions various retraining mechanisms can be used in rod access ports to secure around the closure rod shaft to hold them at selected lengths. Compression ring assemblies tighten its grip around the closure rod shaft when the closure rod is rotated in one direction and releases the closure rod shaft when rotated in the opposite direction, similar to a tightening a sliding pool net.

To transform the valve housing into an operational valve, an operator first confirms that the closure rod sealing the selected access opening is in the "closed" position, then removes the designated cover plate. The cover plate is then replaced with a gate-advancing-mechanism and secured. The closure rod is then retracted enough to expose the interior of the housing or the closure rod is rotated and the gate advanced to the fully closed position. If an advancing-style closure rod is selected, it should be removed completely from the housing and a permanent pipe plug or other closure means should be installed in the closure rod access port. At this point, the valve is fully functional.

If flushing of seating surfaces is required during transforming the valve housing into an operational valve, one confirms that both closure rods in the slots are in the "closed" position, removes the "lower" cover plate and replaces the lower cover plate with a flushing attachment, and secures it.

The "upper" cover plate is then replaced with a gate-advancing-mechanism, and secured. The "upper" and "lower" closure rods are then retracted or rotated enough to expose both access openings, and the flushing attachment activated as you advance the gate mechanism into a fully closed position. If advancing style closure rods are used, both closure rods should be completely removed from the housing and permanent pipe plugs covering the closure rod access ports should be installed in order to provide a fully functional valve.

The gate can be retracted and advanced through the valve structure by known mechanical means, including threaded mechanism, hydraulic means and pneumatic means. A closure rod is incorporated in the valve structure and operated as stated above allowing the gate-mechanism to be installed directly to the housings surface while the valve housing is fully pressurized.

Once a gate is installed into the interior of the housing 11, it seals the interior so that cover plates, power flushing attachments, service isolators, closure rods can be readily removed or reinstalled without loss of fluid. Some styles of closure rods can be pulled out and removed and rod access ports can be plugged in various known permanent ways. Rotatable closure rods can be rotated open or closed as needed.

One advantage of having the internal closure rod is that it allows the gate-mechanism to be short in height. The gate can be designed to extend outside of the gate-mechanism and inserted a fair distance into the valve housing when assembled as long as the closure rod can still function.

Various advancing and retracting gate-mechanisms can be installed, including open structures for above ground applications and hollow-bonneted or covered gates for direct-bury applications. Many known variations of gate mechanisms can be used without departing from the invention of this valve. Gates can be provided with solid, openings, screens, and check valves. In one embodiment, a gate can include one or more sharp cutting edges to open or plane the width of the gap to widen the slot seating surfaces. The gates may use many known coatings including rubber, plating, and bonded materials.

Figure 3:
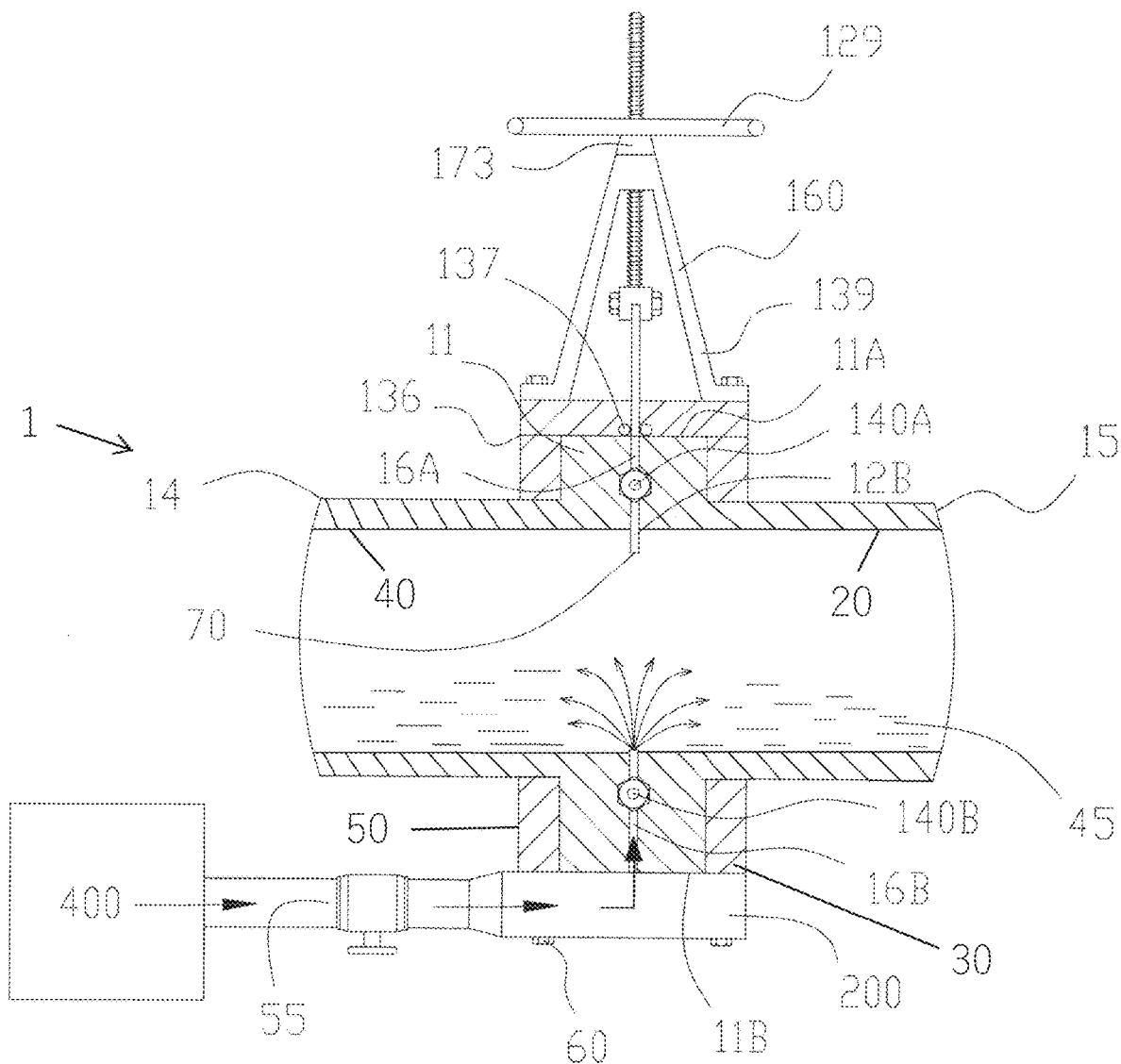
FIG. 3 is a cross-sectional view through the center of another embodiment of the present valve between the proximal and distal ends of the valve.
Figure 4:
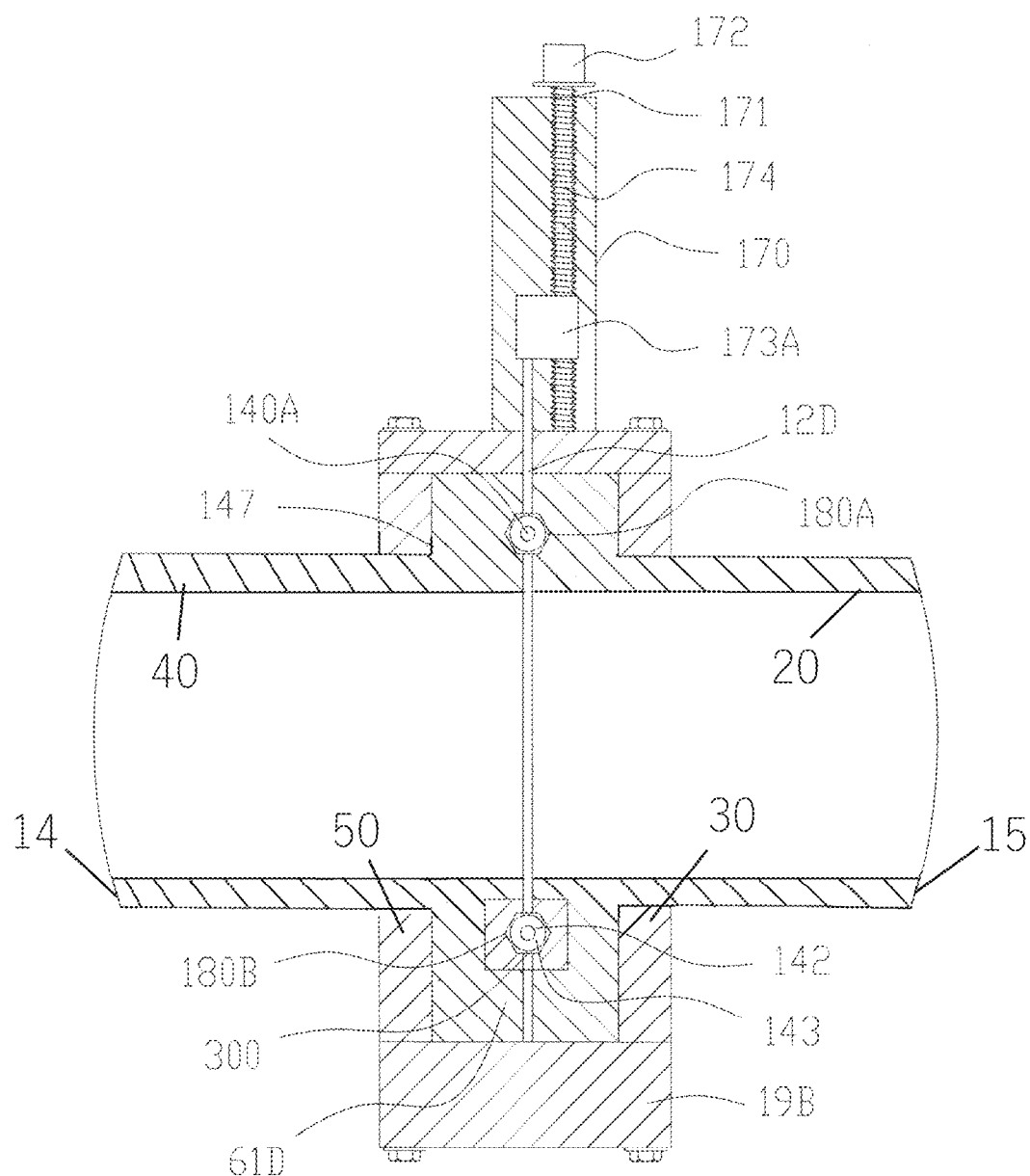
FIG. 4 is a cross-sectional view through the center of yet another embodiment of the present valve between the proximal and distal ends of the valve.
Figure 5:
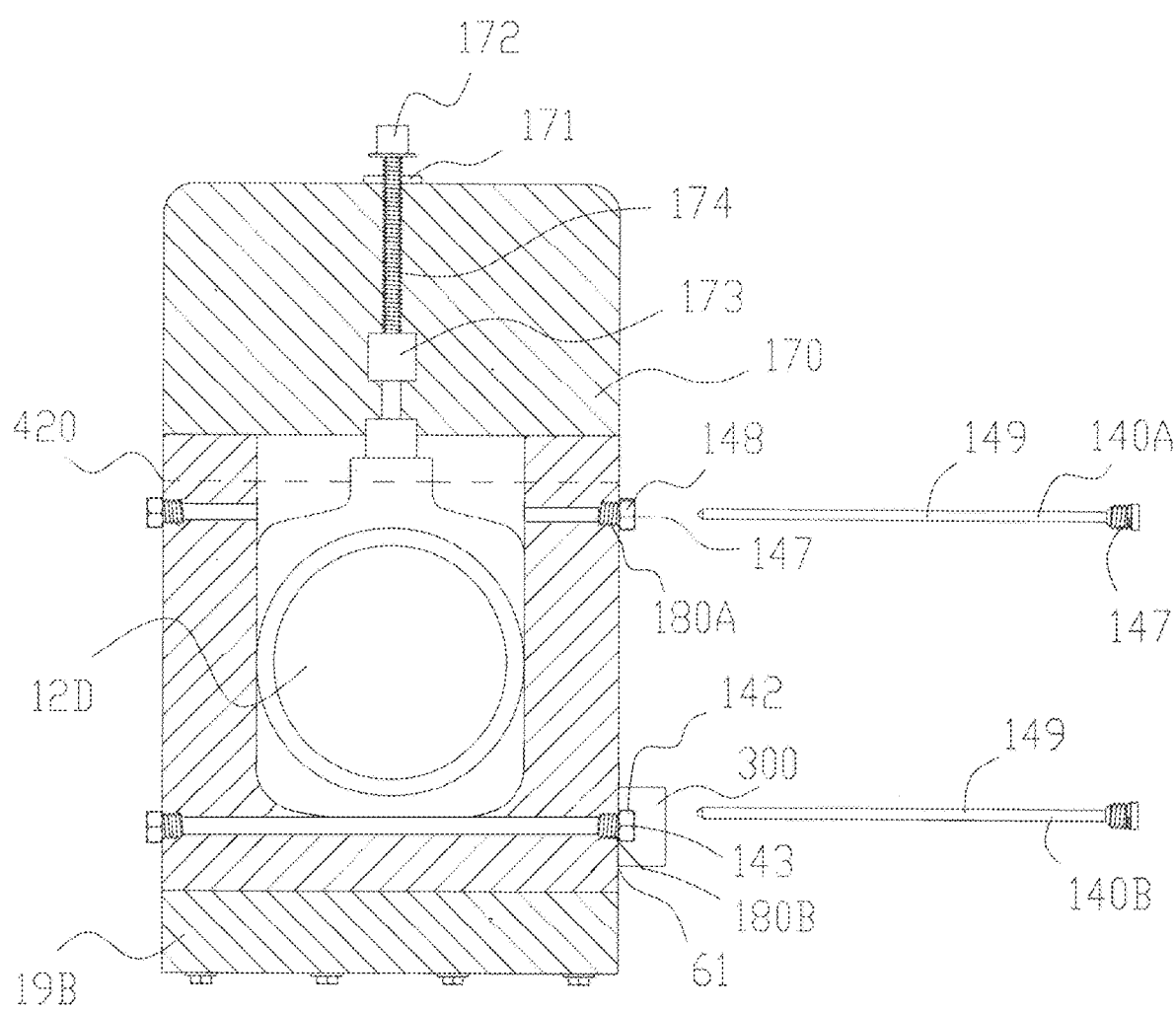
FIG. 5 is cross-sectional view through the center of an embodiment of the present valve between the right and left sides of the valve.

FIG. 1 is a cutaway, side elevation view of a valve 1 constructed according to the present invention, showing axis 13 between proximal end 15 and distal end 14 of housing 11. FIG. 1 shows housing 11 installed in an existing pipeline without a gate-mechanism 160 or 170 (as depicted in FIGS. 3-5). A gate 12 is not installed in the slot 16 in FIG. 1. A gate 12 will be installed into slot 16 if the housing 11 is to be transformed into an operational valve. The gate 12 can be sealed in place within slot 16, more specifically sealing on interior surfaces 7B and 8B of the housing 11. An upper portion of the slot 16 is shown as 16A and lower portion of the slot is shown as 16B.

Closure rods 140A and 140B are installed to provide fluid isolation and control of access openings (covered by cover plates 19A and/or 19B) and can be advanced to a closed (sealing) position and retracted to an open position to allow fluid flow. Rod access ports 180A and 180B are for facilitating the sealing and retaining of closure rods 140A and 140B.

Support plates 32, i.e. distal support plate 32A and proximal support plate 32B, shown in FIG. 1 are preferably made from rigid material, such as metal, to support soft structures. The distal support plate 32A and proximal support plate 32B are preferably secured to each other with a plurality of bolts 90 extending from the proximal support plate to the distal support plate to secure the proximal support plate to the distal support plate. The bolts 90 can be tightened and thereby urged closer together, and when the distal and proximal flanges are positioned between the support plates 32, these flanges will likewise be urged closer together and maintained together in fluid tight engagement. Holes 92 can be included in the flanges in order to allow the passage of the bolts 90 therethrough.

Cover plates 19, i.e. upper cover plate 19A and lower cover plate 19B are used to cover housing 11 and are held in a pressurized state by bolting 60. Optionally, electro-fusion fittings 61a known art can be used to permanently attach cover plates 19A and/or 19B once future services are performed.

Figure 2:
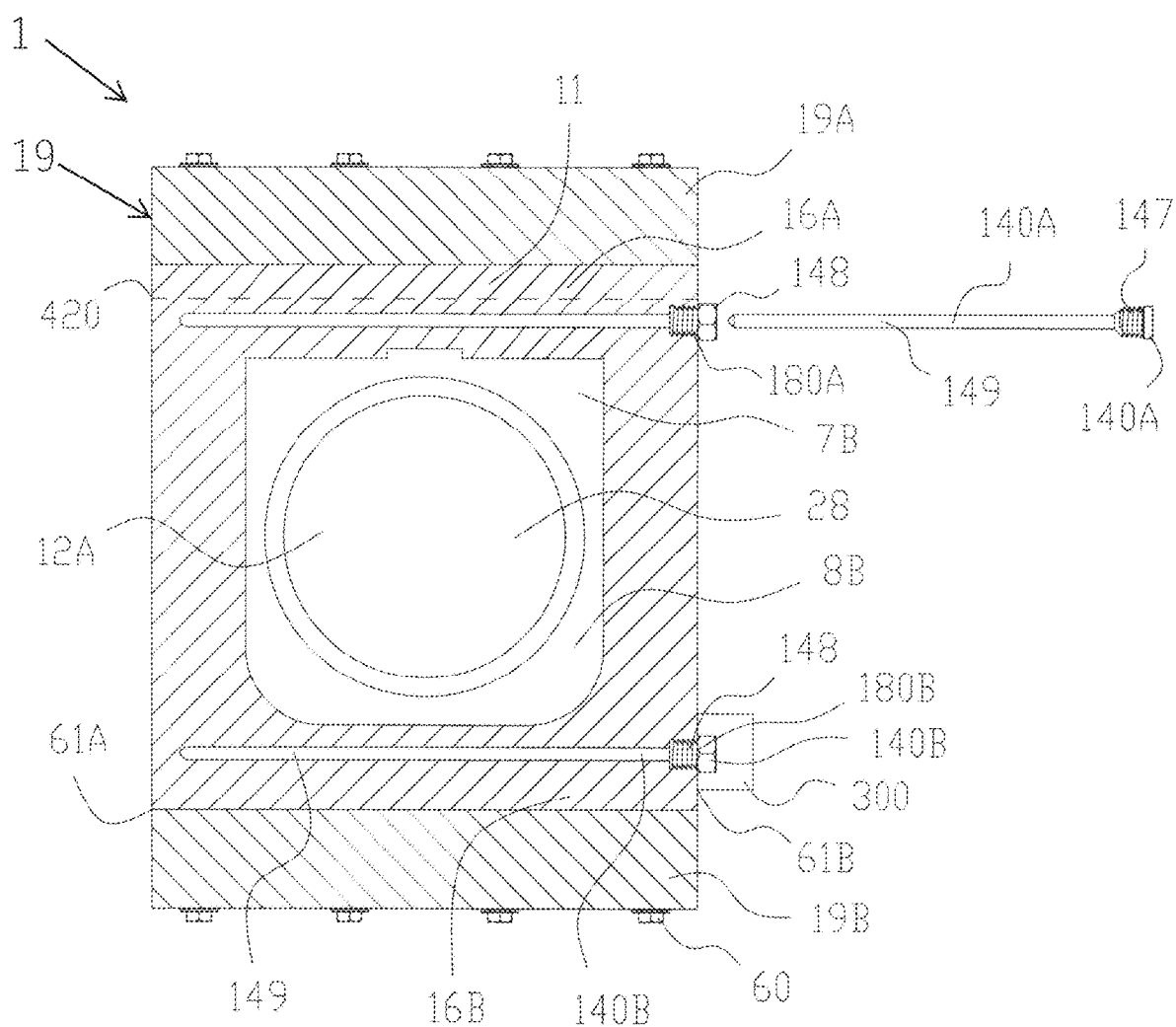
FIG. 2 is cross-sectional view taken through the center of an embodiment of the present valve between the right and left sides of the valve.

FIG. 2 is a sectional front elevation view of the valve 1 with an optional gate 12A installed in housing 11. This is optionally performed when the slot 16 and/or interior of the housing requires protection from heavy sediment. Gate 12A remains inserted into the slot 16 and is seated in fluid tight engagement with distal flange inner face 7B and proximal flange inner face 8B adjacent the slot 16. Pipeline flow continues through the opening 28 in gate 12A and passes through the opening from proximal end 15 through housing 11 to distal end 14.

Location 420 shows the depth that a gate can extend out of the gate-mechanism and extend into the valve housing while the closure rod is in the closed position. The gate can sit into the valve housing 11 as long as the closure rod is free to move. In FIG. 2, the closure rod 140A is shown in the fully open position, fully retracted and exposing slot 16A. Rod shaft 149 depicts the shaft of the closure rod that can seal with the rod access and hold the closure rod at various positions by use of a known a cam type grip that allows movements but when twisted it retains the closure rod at various given locations. Closure rod 140B is shown as being fully advanced into the "closed" position isolating slot 16B, so no fluid can pass closure rod 140B. In this position, closure rods 140 can use a tapered male pipe-plug 147 secured to the end of the closure rod, as shown in closure rod 140A, to mate with female thread 148.

A cover plate 300 made from the same or similar material as housing 11 can be used to cover a closed closure rod such as closure rod 140B using rod access assemblies 180B for a permanent closure. This cover plate 300 can be connected by an electro-fusion fitting 61b, bolting, or another method known to the art.

FIG. 3 is a partial cutaway, side elevation view of the valve 1 showing an installable gate opening mechanism 160 that can be attached directly to housing surface 11A over slot 16A. This gate-mechanism 160 includes a support structure 139 and a packing 137 that seals fluid from escaping past gate 12B. Gasket material 136 can be used to seal between the gate-mechanism 160 and the surface of the lower end 11A of the housing.

A flushing attachment 200 can be selectively attached directly to housing surface 11B over the lower slot 16B and connected to an external pressure-producing pump 400. Fluid 55 is pumped through attachment 200 into slot 16B to flush slot 16 and the valve structure 11, thereby moving debris 45.

An advancing assembly 129 in gate-mechanism 160 operates by rotating the handle to advance the gate 12B, while reversing the rotation of handle 129 retracts gate 12B from the slot 16. Gate 12B can provide a planing edge 70 that can be used to open up the gate-receiving gap or slot 16.

FIG. 4 is a cutaway, side elevation view of the valve 1 showing a housing 11 with a buried-gate mechanism 170 installed and used for direct bury. The housing 170 is hollow to hold gate 12D, allowing movement when buried and protecting it. The threaded actuator rod 174 allows a nut 173 to travel, thereby advancing and retracting the gate 12D. Operating nut 174 can be accessed from aboveground by a conventional extension "T" wrench used to operate the nut 172 that can be buried within a tube or can. Typical known packing 171 can be used to seal the stem with the bonnet of this unit.

Closure rod 140A is removed in FIG. 4, and rod access 180A is shown to hold the closure rod and given lengths and be sealed with a threaded pipe-plug 147. Closure rod 140B is removed and rod access 180B is shown to hold and be sealed with a fused plug 143. Rod access 180B and closure rod 140B are covered by a cover-plate 300, which can be fused using electrofusion fittings 61d.

FIG. 5 is a cutaway, front elevation view of the valve 1 shown in FIG. 4, with housing 11 depicting a buried-gate mechanism 170 installed for use in a direct bury application. The threaded actuator rod 174 allows a nut 173 to travel, advancing and retracting the shown solid gate 12D. Operating nut 174 can be accessed from aboveground by a conventional extension wrench to operate the presented nut that can be buried within a tube or can. Typical known packing 171 can be used to seal this.

Location 420 is the depth a gate can extend out of the gate mechanism into the valve housing 11 while the closure rod is in the closed position. The gate can sit a distance into the valve housing as long as the closure rod is free to move.

Rod access 180A is shown as being held and sealed with a pipe plug 147, and rod access 180B is secured in the closed position. Rod-shaft 149 of the closure rod can seal with the valve housing and hold the closure rod at various lateral positions by use of a known a cam type grip that allows movements but when twisted it retains the closure rod at various given locations, thereby regulating the amount of fluid flow between the interior of the housing 11 and the lower access opening. A lower pipe-plug 142 can be installed when closure rod 140A and/or 140B are removed. Alternatively, a fusible plug 143 can be fused using an electrofusion fitting 61 in these locations for a permanent plastic seal. Optionally, a cover plate 300 made from the same or similar materials as the housing 11 can used to cover closure rod 140 and rod access 180 assemblies for a permanent closure, as shown in FIG. 4. This cover 300 is shown to be welded by electro-fusion 61, but can be attached by other known means.

Figure 6:
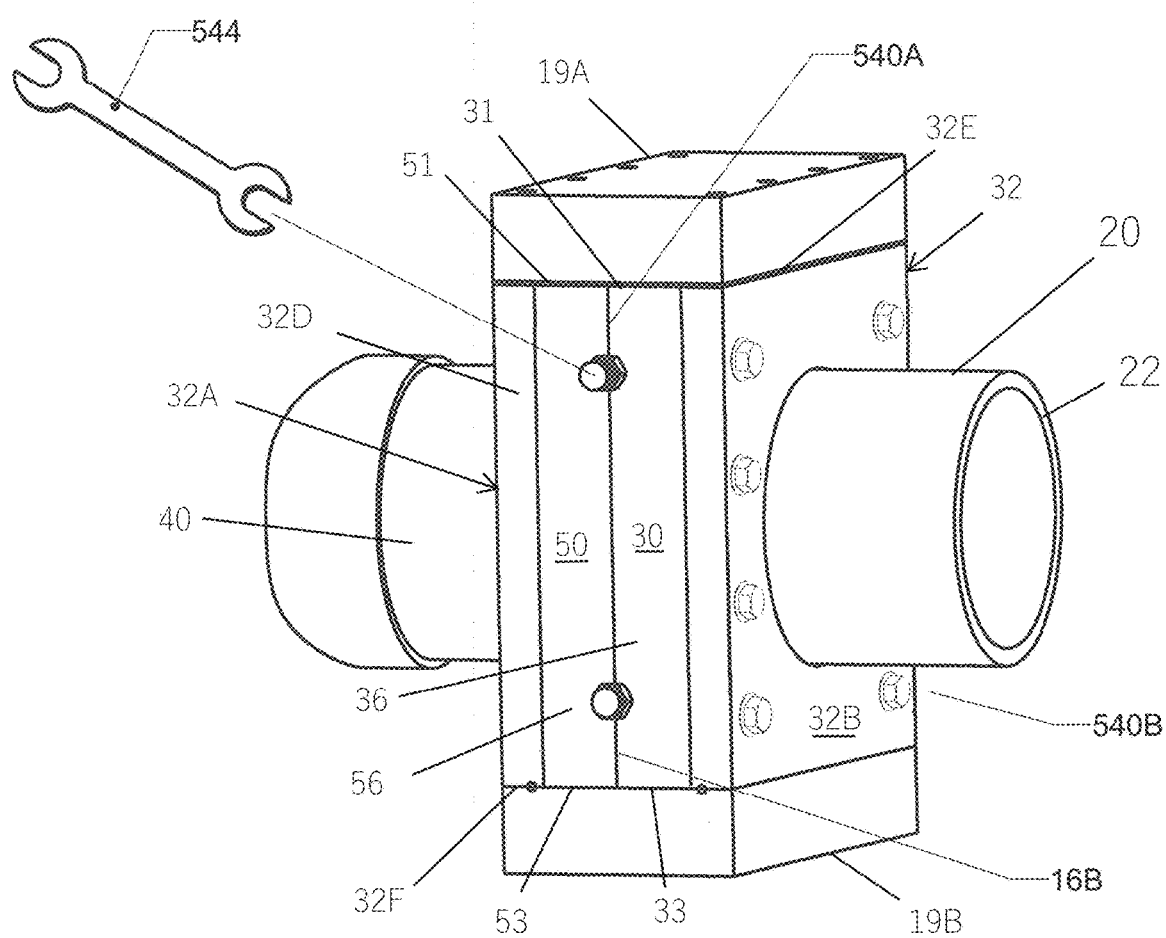
FIG. 6 is a perspective view of an embodiment of the present valve.
Figure 7:
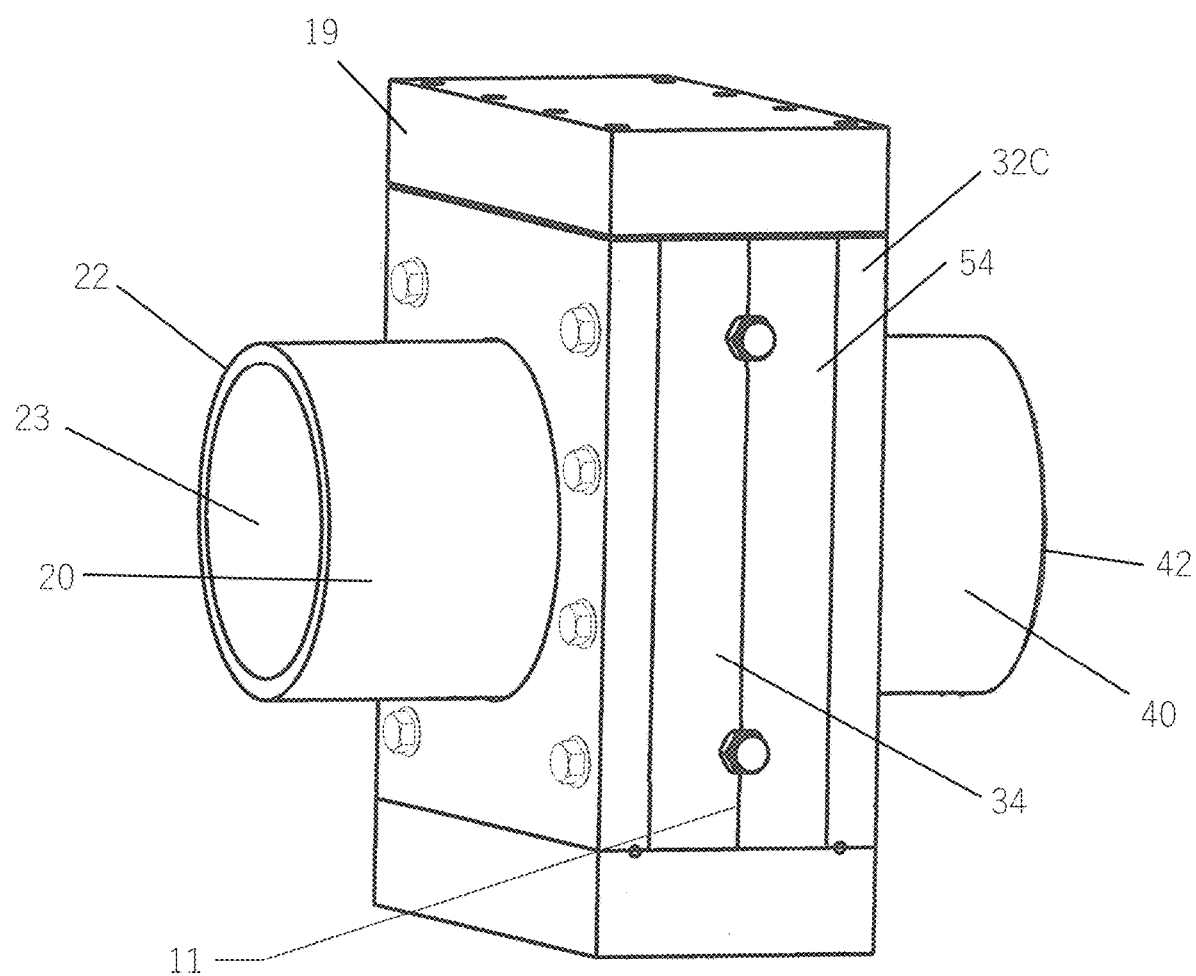
FIG. 7 is another perspective view of an embodiment of the present valve.
Figure 8:
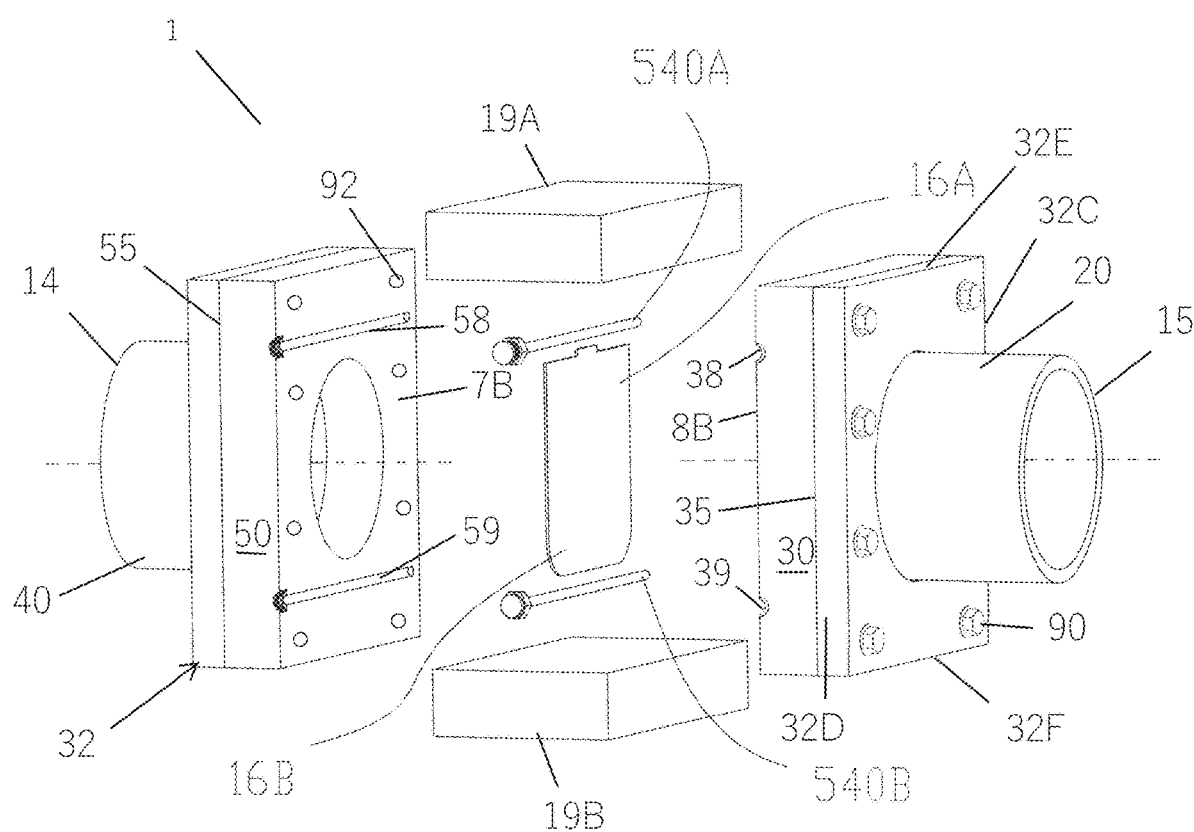
FIG. 8 is an exploded view of the valve of FIG. 7.

FIG. 6 is a perspective view showing closure rod 540A and MOB in the valve. Closure rod 540A can be rotated with a wrench 544 to operate closure rod 540A between the open and closed positions.

The valve illustrated in FIG. 1 can, for example, include 6-inch (15.2 mm) interior diameter conduit which might typically work with a pipeline with the outside diameter (O.D.) measuring about 6.5 inches (16.5 mm) to 7.75 inches (19.7 mm), but the present valve and housing can work with any of various sized pipelines with 1 inch (2.5 mm) diameter up to 144-inch (3660 mm) or larger diameter. A housing 11 constructed according to the invention is sized according to the pipe O.D. and gate with which it will be used.

The housing 11 can be formed by more than one piece assembled together in fluid tight engagement by known means such as bolting or fusion and can use gaskets, o-rings and other sealing materials. The housing includes a through body slot 16 that defines a hollow body interior portion of the housing that includes slots 16A and 16B (FIG. 1). The slot 16A preferably extends to slot 16B with a gates-specific sealing area between interior surfaces 7B and 8B of the housing where the gate will seat.

The interior of housing 11 comprises a first interior sealing face 8B in communication with a first opening 28 of the housing and a second interior face 7B in communication with a second opening 28. The first interior face 8B is preferred disposed as parallel with respect to the second interior face 7B matching gate 12, though if desired, matching angles can be used. The gate 12 can be removably mounted within the slot 16, where it functions as a means for enabling a user to selectively stop and unstop fluid communication, for example, or to perform other control functions between the proximal end 15 and distal end 14 of the housing 11.

Preferably, housing 11 includes means for maintaining fluid tight connections between the upper surface 11A and lower surface 11B, and pressure cover plates 19A and 19B, respectively. Lower surface 11B (FIG. 3) adjacent the slot 16B of the housing 11 facilitates the direct fluid tight connection of power flushing attachment 200. The power flushing attachment 200 (FIG. 3) can be installed or removed while the valve structure is fully pressurized when gate 12 is installed into the slot 16A and 16B in fluid tight engagement. When the gate 12 is installed, pipeline fluid cannot pass between slot 16A and 16B, and this allows the power flushing attachment 200 to be selectively installed and removed while the system is fully pressurized.

Gate-Mechanism

A gate can be used together with an advancing-gate mechanism, such as an open-gate mechanism 160 (FIG. 3) or a hollow (buried gate) mechanism 170 (FIG. 4,5) (e.g., a rotatable threaded stem and nut combination 129). The pipeline advancing mechanism 129 (FIGS. 3, 4, and 5) functions as a means for enabling a user to advance the gate 12 between open and closed positions. When the gate 12 (FIGS. 2, 5) is in the installed position of engagement with the slot 16 (FIG. 3), it stops flow so no fluid passes beyond the gate 12 into slot 16A and 16B. When withdrawn fluid is allowed to pass through the housing 11 and into slot 16. The gate-advancing mechanism 129 advances (e.g., using a hand-wheel, wrench or suitable tool) as the actuator stem rotates on a rotational axis that is preferably perpendicular to the valve body axis 13, and the gate 12 advances or withdraws along a rotational axis 13 (FIG. 3). Preferably, the gate-advancing mechanism comprises a rigid flange or rod 129 capable of exerting "downward" force on the gate, in order to help install the gate. Though common known gearing and attachments make this a direct bury "nut" operated valve shown in (FIG. 4,5). A permanent or removable gate-assembly 160 or 170 with an advancing mechanism 129 can be left in place to allow the valve housing 11 to act as a operational gate control valve.

A variety of gates 12 and advancing mechanisms used in the industry can be used with the present valve 1, including hand operated mechanisms. This allows for gate mechanisms to be directly connected onto the housing 11 (as shown in FIG. 3, 4, 5) on surfaces 11A over slot 16A in fluid tight connection. If a valve with soft seats inadvertently suffers damage by scoring, a gate 12B (shown in FIG. 3) can incorporate a planing mechanism 70 having wider edges that mechanically are advanced through the slot 16A and 16B, making it uniformly wider, in turn allowing a wider gate to be installed, thus repairing the damage.

Closure Rod for Service Isolator

Advantageously, a closure rod 140 can be used to allow isolation of the access opening so that installation and removal of gates 12 and flushing attachments 200 to housing 11 is quick and inexpensive. In one embodiment, the closure rod 540 can be a rotational member, as shown in FIG. 6.

The closure rods are equal to or larger in diameter than the gate and cross or intersect through the slots 16 as shown in FIGS. 1-5. Closure rods are long enough to cross through the entire length of the slot and are operated externally outside of the valve housing. When a closure rod is fully "advanced", or pushed into the valve housing, it preferably reaches the "closed" position. Alternatively, rotational rod embodiments can be rotated to the "closed" position to isolate the internal slot, sealing it in fluid tight engagement so that no fluid can pass. When the closure rod is "retracted" away from the valve housing to the "open" position, or when a rotational rod is rotated into the "open" position, the slot can be exposed and opened to receive a gate, accept flushing assemblies, and/or allow fluid passage.

Rod access ports 180, such as upper rod access port 180A and lower rod access port 180B can be incorporated directly onto the housing 11 or can use various types of intermediate bushings or other assemblies to facilitate the closure rod functions. Rod access ports 180 on the valve body 5 allow a closure rod to seal the valve when moved and that secures the shaft of the closure rod, preferably holding it in place by use of a rotating tension device, similar to the way that a pool net extension works, enabling secure and/or permanent sealing when services are complete. Various sealing methods can be imagined and different retaining mechanisms can be used to secure the rod access ports to the valve housing and provide sealing between the valve housing and the closure rod. One type of closure rod uses a pipe plug attached at the external end of the closure rod to screw into a mating female thread on the rod access or the valve body once the rod is in the installed or closed position.

Rod access areas are designed to restrain closure rods, attach them to the valve body, and keep them at various positions, and to work together to provide sealing of closure rods. The rod access ports 180 can provide temporary sealing during valve services and provide a means to permanently or reversibly seal with the closure rod 140 when services are complete.

Various sealing methods can be imagined and different retaining mechanisms can be used to secure the closure rod shaft 149 at various advancing and retracting positions and permanently seal closure rods 140 and rod access 180 together when services are complete as seen with 180B in FIG. 6. When valve services are complete, rod access 180 and closure rod 140 can attach together, retaining and sealing into a secure position. This function (shown in FIGS. 2 and 5) can be achieved with a male end 147 of the closure rod 140B having a tapered thread and a receiving female thread 148 accepting the thread and being screwed together in fluid tight engagement. Flanges, clips, cam action, compression or fusion connections, along with many other retaining methods known to the art, can be used to retain, seal and hold the closure rods to the valve body without departing from the method shown.

Method of Use

FIG. 1 illustrates a valve housing 11 that may not originally be a complete operational valve, but the valve housing can be installed into a pipeline in anticipation that a fully functioning future valve at that location may be required.

When the housing 11 is required to become an operational valve, as shown in FIGS. 3, 4, and 5, one confirms that closure rod 140A controlling the selected slot 16A is in the "closed" position. Cover plate 19A is removed from housing surface 11A and the gate-mechanism 160 (FIG. 3) or gate-mechanism 170 (FIG. 4) is securely installed in place of cover plate 19A. Closure rod 140A is retracted or closure rod 540 is rotated, as the case may be, enough to fully expose slot 16A and advance the gate-mechanism 160 to its fully closed or "installed" position. After this, closure rod 140A can be removed completely and pipe plug 147 can be installed into the female thread 148 of rod access port 180A, or rotational closure rod 540 can be left in the open position, as desired. The valve at this point is fully functional.

This embodiment can also be provided as a fully functioning valve (FIGS. 3, 4, 5). The functioning valve is installed into a pipeline with anticipation that removal of the gate-mechanism may be desired at a future date. The complete valve is installed with gate-mechanism 160 or 170 in place. When it is desired to convert the functioning valve (FIG. 3, 4, 5) into a non-operational valve housing 11 (FIG. 1), the gate mechanism 160 is fully advanced to its closed position. For advancing closure rods, pipe plug 147 is removed from rod access port 180A. Advancing closure rod 140A can be inserted until it touches the gate.

Gate mechanism 160 is then raised above the closure rod, and the closure rod 140A is fully advanced into housing 11, after which pipe plug 147 is rotated onto the female thread 148 of rod access port 180A to seal off the housing interior. For rotating closure rods, the rod can be rotated to the "closed" position. The gate mechanism 160 (FIG. 3) or gate mechanism 170 (FIG. 4) can then be removed from housing 11. Finally, cover plate 19A can be installed onto housing surface 11A to provide a valve-less valve assembly.

If flushing of debris 45 is required during the process of transforming housing 11 into an operational valve, the following steps can be followed. A user first confirms that both closure rods 140A and 140B or 540A and 540B are in the "closed" or installed position. The "lower" cover plate 19B is then removed from housing surface 11B and securely replaced with flushing attachment 200 (FIG. 3). Cover plate 19A is then removed from housing surface 11A and gate mechanism 160 (FIG. 3) or gate mechanism 170 (FIG. 4) are securely installed in place of cover plate 19A. The closure rod 140A and closure rod 140B are then retracted to fully open the slot 16, or rods 540A and 540B are rotated to the "open" position. With slot 16B open, the external pressure producing pump 400 (FIG. 3) forces fluid 55 into power flushing attachment 200 to provide flushing of debris 45 away from the seating areas 7B and 8B of slot 16 and the gate 12 until full engagement of gate 12 is achieved.

Pressurized fluid 55 can be injected at or above the working pressure of the pipeline during gate movements, and fluid 55 can create enough flushing force to push particles 45 away from the seating surfaces of slot 16 and gate 12 to allow engagement without being hindered by debris 45 as shown in FIG. 3. Once gate 12 achieves fluid tight engagement with the slot 16 of valve body 11, the external pressurized fluid 55 can be terminated, since no fluid can pass through slot 16 because the gate 12 is in fluid tight engagement with valve body 11 (FIG. 3). The power flushing attachment 200 can be removed without a closure rod. With gate 12 in the installed position, both closure rods 140A and 140B can be removed without loss of fluid and a pipe plug or fused cap can be installed in place of the closure rod if desired. Rotational closure rods can be left in the rotated open or closed position as desired. Cover plate 19B can then be reinstalled to provide a fully functional valve.

In the case of damage to the fluid tight engagement surfaces 7B and 8B of slot 16, the following method of repair can be used. A gate 12 provided with a planing edge 70 at its distal (FIG. 3) end can be attached to gate-mechanism 160 installed on housing surface 11A. The gate can be actuated using the handle of advancing mechanism 129, thereby advancing the planing edge into the slot and cutting the width of the slot 16 to a wider dimension. Many advancing mechanisms 129 to actuate gate 12 with planing edge 70 can be used to perform this task, including mechanical, air, hydraulic and electric known drives. During this process, flushing attachment 200 (FIG. 3) can introduce fluid 55 to flush particles 45 away from engagement surfaces of slot 16 and gate 12 as needed. Once planing has completed widening and smoothing the slot 16, if desired, gate 12 with planing edge 70 can be switched with another style of gate 12 by the methods shown above or simply left engaged in fluid tight arrangement with the housing 11.

To summarize the above-described methodology, this method is one for providing an incomplete or complete valve when initially installed with a new pipeline. The valve housing incorporates simple isolation means that can allow simple transformation of the valve body at a later date into a fully functioning or non-functioning valve. The cost savings and longevity of installing this invention allows more isolation locations to be added to new pipeline systems and the valves working components are not damaged over time.

Many valves never get exercised, used or maintained so valves can become non-functioning over time. This preferred method allows for a valve to be fully functional only when the need arises, and the valve can be returned back to non-controlling valve housing if desired. It can convert a valve quickly without complicated procedures. Many municipalities fail to maintain installed valves, leading to many problems.

Many service functions can also be performed while the valve is fully pressurized. Because this preferred method uses closure rods as disclosed above, the need for bulky and expensive attachable service isolators to perform field operations is obviated. The closure rods allow for low manufacturing costs and are simple to use.

In addition, flushing of debris, sand and particles away from the gate seating surfaces within the valve structure allows soft, long term materials to be used for manufacturing of valves, such as PVC or HDPE. These soft materials are used in pipeline manufacturing today but are not desired for large valves. Other materials can also be used in the present valve, including known materials useful with pipelines and combinations of such materials, such as stainless brass, metals, plastics and composites.

Based on the foregoing descriptions, one of ordinary skill in the art can readily practice the invention and incorporate various changes without departing form the scope of the claims. The valve body, for example, can be manufactured from any of various materials, including ductile iron, cast iron, stainless steel, brass, plastics and any of various exotic materials needed in special applications. The size can range from 1-inch (2.5 mm) diameter or less to a 144-inch (366 mm) diameter or more. In addition, the first and second ends of the valve body can be configured so that a user can readily connect each end to a respective one of separate first and second pipeline sections, either directly or via intermediate fittings using any of various known connection means. These could include flanged, mechanical joint, pipe threads, solder, welded ends, fuse, compression, push-in fittings, groove locking methods, including cam locks.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference in their entirety.

What is claimed is:

1. A valve comprising a housing, the housing having a proximal end, a distal end, an upper end, a lower end, a right side, and a left side, wherein the housing comprises:
   (a) a proximal conduit portion comprising:
      (i) a proximal conduit having an interior surface for conducting a fluid, a proximal end for coupling to another conduit and a distal end;
      (ii) a proximal flange extending outwardly from the distal end of the proximal conduit, the flange having an upper end, a lower end, a right side, a left side, an outer face, and an inner face;
      (iii) a proximal upper groove extending between the right side and the left side of the proximal flange above the proximal conduit;
      (iv) a proximal lower groove extending between the right side and the left side of the proximal flange below the proximal conduit;
   (b) a distal conduit portion comprising:
      (i) a distal conduit having an interior surface for conducting a fluid, a distal end for coupling to another conduit and a proximal end;
      (ii) a distal flange extending outwardly from the proximal end of the distal conduit, the flange having an upper end, a lower end, a right side, a left side, an outer face, and an inner face, wherein the inner face of the distal flange faces the inner face of the proximal flange of the proximal conduit portion, and wherein the inner face of the distal flange of the distal conduit portion is in fluid tight engagement with the inner face of the proximal flange of the proximal conduit portion around a periphery of the proximal flange and the distal flange;
      (iii) a distal upper groove extending between the right side and the left side of the distal flange above the distal conduit, wherein the distal upper groove and proximal upper groove are adjacent to each other and cooperate to form an upper elongated receptacle for an upper closure rod;
      (iv) a distal lower groove extending between the right side and the left side of the distal flange below the distal conduit, wherein the distal lower groove and proximal lower groove are adjacent to each other and cooperate to form a lower elongated receptacle for a lower closure rod;
   (c) a proximal support plate extending around the periphery of the proximal conduit and having an upper end, a lower end, an outer face and an inner face, wherein the inner face of the proximal support plate is adjacent to the outer face of the proximal flange;
   (d) a distal support plate extending around the periphery of the distal conduit and having an upper end, a lower end, an outer face and an inner face, wherein the inner face of the distal support plate is adjacent to the outer face of the distal flange, and wherein the proximal support plate is secured to the distal support plate;
   (e) an upper cover plate which is reversibly securable to the upper end of the proximal support plate and the upper end of the distal support plate;
   (f) a lower cover plate which is reversibly securable to the lower end of the proximal support plate and the lower end of the distal support plate,
   (g) an upper slot between the inner face of the proximal flange and the inner face of the distal flange and extending between the upper end of the housing and the proximal and distal conduits; and
   (h) a lower slot extending between the lower side of the housing and the proximal and distal conduits;
   wherein the upper closure rod is held in fluid-tight engagement when positioned in the upper elongated receptacle and the lower closure rod is held in fluid-tight engagement when positioned in the lower elongated receptacle.

2. The valve of claim 1, wherein the upper closure rod is selected from the group consisting of a rod and a tube.

3. The valve of claim 1, further comprising a plurality of bolts extending from the proximal support plate to the distal support plate to secure the proximal support plate to the distal support plate.

4. The valve of claim 1, further comprising a gate.

5. The valve of claim 4, wherein the gate is positioned within at least the upper slot.

6. The valve of claim 1, further comprising an upper rod access port in communication with the upper elongated receptacle.

7. The valve of claim 1, further comprising a lower rod access port in communication with the lower elongated receptacle.

8. The valve of claim 4, further comprising a gate opening mechanism.

9. The valve of claim 1, wherein the proximal flange and the distal flange are made from PVC or HDPE.

10. The valve of claim 1, wherein the lower closure rod is selected from the group consisting of a rod and a tube.

* * * * *